US009060160B2

(12) United States Patent
Nishi

(10) Patent No.: US 9,060,160 B2
(45) Date of Patent: Jun. 16, 2015

(54) IMAGE GENERATION DEVICE, IMAGING DEVICE, IMAGE REPRODUCTION DEVICE, AND IMAGE REPRODUCTION PROGRAM

(75) Inventor: Takeshi Nishi, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 472 days.

(21) Appl. No.: 13/120,783

(22) PCT Filed: Sep. 24, 2009

(86) PCT No.: PCT/JP2009/066535
§ 371 (c)(1),
(2), (4) Date: Nov. 7, 2011

(87) PCT Pub. No.: WO2010/035752
PCT Pub. Date: Apr. 1, 2010

(65) Prior Publication Data
US 2012/0062759 A1    Mar. 15, 2012

(30) Foreign Application Priority Data
Sep. 24, 2008    (JP) ................. 2008-244361

(51) Int. Cl.
H04N 5/228    (2006.01)
H04N 5/77    (2006.01)
H04N 5/232    (2006.01)

(52) U.S. Cl.
CPC ........... H04N 5/772 (2013.01); H04N 5/23277 (2013.01)

(58) Field of Classification Search
USPC ........ 348/222.1; 382/243, 203, 190, 236, 238
IPC ................ H04N 5/232,5/2356, 5/23293, 5/772, H04N 5/335, 9/045
See application file for complete search history.

(56) References Cited

U.S. PATENT DOCUMENTS

| 2004/0131254 A1* | 7/2004 | Liang et al. ................... 382/181 |
| 2005/0041156 A1* | 2/2005 | Kondo et al. ................. 348/700 |
| 2007/0086675 A1* | 4/2007 | Chinen et al. ................. 382/284 |
| 2008/0024619 A1 | 1/2008 | Ono |

FOREIGN PATENT DOCUMENTS

| JP | A-2000-187478 | 7/2000 |
| JP | A-2003-316348 | 11/2003 |
| JP | A-2004-214830 | 7/2004 |
| JP | A-2004-312493 | 11/2004 |
| JP | A-2005-109648 | 4/2005 |
| JP | A-2007-304675 | 11/2007 |

(Continued)

OTHER PUBLICATIONS

International Search Report issued in International Application No. PCT/JP2009/066535 dated Dec. 28, 2009 (with translation).

(Continued)

Primary Examiner — Yogesh Aggarwal
(74) Attorney, Agent, or Firm — Oliff PLC

(57) ABSTRACT

An image generation device includes a video image generation means for generating a video image of a target photographic subject within a photographic subject on the basis of a plurality of captured images that are acquired by capturing images of the photographic subject in time series, and a background image generation means for generating a background image of the target photographic subject on the basis of the captured images.

10 Claims, 6 Drawing Sheets

(56) References Cited

FOREIGN PATENT DOCUMENTS

| | | |
|---|---|---|
| JP | A-2008-035028 | 2/2008 |
| JP | A-2008-118481 | 5/2008 |

OTHER PUBLICATIONS

Dec. 4, 2012 Japanese Office Action issued in Application No. 2010-530855 (with translation).

Japanese Office Action issued in Japanese Patent Application No. 2010-530855 on Mar. 26, 2013 (with translation).

Mar. 11, 2014 Office Action issued in Japanese Patent Application No. 2013-131844 (with translation).

Sep. 16, 2014 Office Action issued in Japanese Application No. 2013-131844 (with translation).

* cited by examiner

IMAGE GENERATION DEVICE, IMAGING DEVICE, IMAGE REPRODUCTION DEVICE, AND IMAGE REPRODUCTION PROGRAM

TECHNICAL FIELD

The present invention relates to an image generation device, an imaging device, an image reproduction device, and an image reproduction program.

BACKGROUND ART

In the prior art a technique is known in which, for generation of a combined image in which a shifting photographic subject has been eliminated from a video image, a decision is made as to whether or not the shifting photographic subject is a specified photographic subject that has been registered, and, if it has been decided that it is not such a specified photographic subject, then undesirable elimination of a shifting photographic subject to which the photographer is directing his attention by extraction of the background image and combination thereof into the position of the shifting photographic subject is prevented (refer to Patent Document #1).

CITATION LIST

Patent Literature

Patent Document #1: Japanese Laid-Open Patent Publication No. 2007-304675.

SUMMARY OF THE INVENTION

Technical Problem

The prior art technique disclosed in Patent Document #1 is a method for generating a video image or a still image in which a shifting photographic subject has been eliminated, by combining the background image over the position of the shifting video subject on the basis of a video image. On the other hand, the present invention takes it as its object to obtain a technique required for dynamically reproducing a captured image that has been acquired as a still image.

Solution to the Problem

An image generation device according to a 1st aspect of the present invention includes: a video image generation means for generating a video image of a target photographic subject within a photographic subject on the basis of a plurality of captured images that are acquired by capturing images of the photographic subject in time series; and a background image generation means for generating a background image for the target photographic subject on the basis of the captured images.

According to a 2nd aspect of the present invention, in the image generation device of the 1st aspect, it is preferred that: the video image generation means generates the video image on the basis of images of the target photographic subject that are respectively extracted from the plurality of captured images; and as the background image, the background image generation means generates a single still image based upon the plurality of captured images.

According to a 3rd aspect of the present invention, in the image generation device of the 2nd aspect, it is more preferred that information specifying the position of the target photographic subject with respect to the background image and the movement of the target photographic subject with respect to the background image is appended to the video image.

An imaging device according to a 4th aspect of the present invention includes: the image generation device of any one of the 1st through 3rd aspects; and an image capture means for capturing images of the photographic subject and thereby acquires the captured images.

An image reproduction device according to a 5th aspect of the present invention dynamically reproduces the captured images on the basis of the video image and the background image generated by the image generation device of any one of the 1st through 3rd aspects.

According to a 6th aspect of the present invention, in the image reproduction device of the 5th aspect, it is preferred that the captured image is dynamically reproduced by displaying the video image overlaid over the background image and by shifting the display position for the video image over the background image.

An image reproduction program according to a 7th aspect of the present invention is for, on the basis of the video image and the background image generated by the image generation device of any one of the 1st through 3rd aspects, dynamically reproducing the captured images with a computer that is connected to a monitor, by which the computer is caused to execute: a reading step of causing the video image and the background image to be read in to the computer; and a reproduction step of causing the computer dynamically to reproduce and display the captured images upon the monitor, on the basis of the video image and the background image read in by the computer in the reading step.

According to an 8th aspect of the present invention, in the image reproduction program of the 7th aspect, it is preferred that, in the reproduction step, the computer is caused dynamically to reproduce the captured images upon the monitor by displaying the video image upon the monitor overlaid over the background image, and by shifting the display position of the video image over the background image.

Advantageous Effect of the Invention

According to the present invention, it is possible to obtain a technique required for dynamically reproducing a captured image as a still image.

DESCRIPTION OF THE EMBODIMENT

Figure 1:
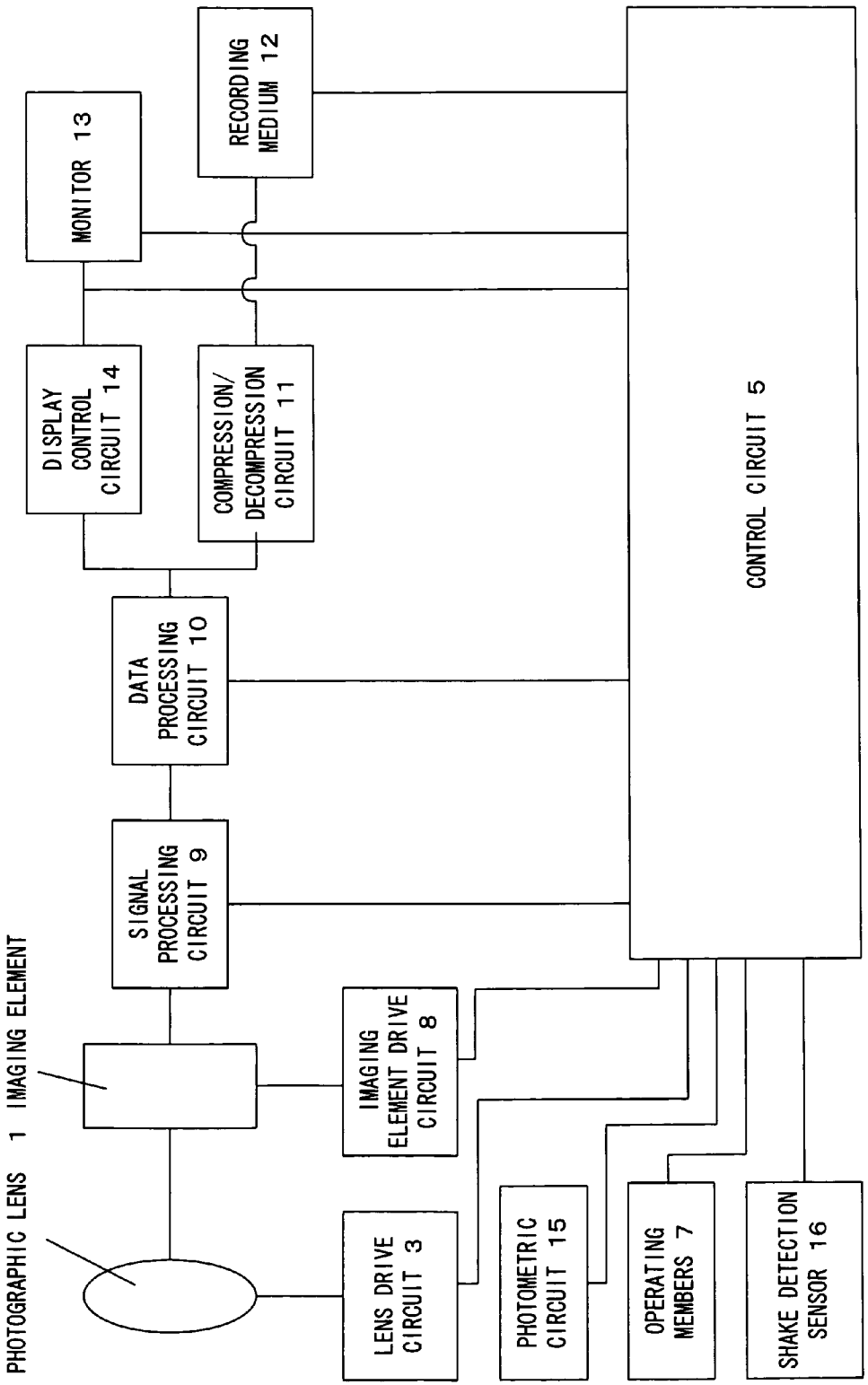
FIG. 1 is a block diagram showing an example of the structure of an imaging device.

An embodiment for implementation of the present invention will now be explained with reference to the drawings. FIG. 1 is a block diagram showing an example of the structure of an imaging device according to an embodiment of the present invention. In FIG. 1, this imaging device includes an imaging element 1, a photographic lens 2, a lens drive circuit 3, a control circuit 5, operating members 7, an imaging element drive circuit 8, a signal processing circuit 9, a data processing circuit 10, a compression/decompression circuit 11, a monitor 13, a display control circuit 14, a photometric circuit 15, and a shake detection sensor 16; and a recording medium 12 is also provided.

The recording medium 12 is a memory card, a compact hard disk, or an optical disk such as a DVD or the like. It should be understood that this recording medium 12 may be internal to the imaging device, or alternatively may be installed thereto in a removable manner. Moreover, it could also be provided externally to the imaging device. In this case, the recording medium 12 would be electrically connected to the imaging device by a cable or by wireless.

The photographic lens 2 is built up from a plurality of lens groups that make up a photographic optical system, and forms an image of a photographic subject upon a photographic imaging surface of the imaging element 1. The photographic lens 2 includes a focusing lens not shown in the figures. This focusing lens is driven forwards and backwards along the direction of the optical axis by a lens drive circuit 3. Due to this, the focus adjustment state of the photographic lens 2 changes, and thereby focus adjustment of the photographic lens 2 is performed. Moreover, the photographic lens 2 includes a zoom lens not shown in the figures. This zoom lens is driven forwards and backwards along the direction of the optical axis by the lens drive circuit 3. Due to this, the focal length of the photographic lens 2 changes, and thereby zoom adjustment of the photographic lens 2 is performed.

Moreover, the photographic lens 2 includes a shake correction lens not shown in the figures. On the basis of the output of the shake detection sensor 16, this lens for shake correction is driven by the lens drive circuit 3 in directions orthogonal to the optical axis of the photographic lens 2. Due to this, the position at which the photographic subject image is formed upon the imaging element 1 shifts in such a direction as to cancel out shaking of the imaging device, and thereby shake correction is performed. Due to this type of shake correction, it is possible for photography to be performed with this imaging device while alleviating camera shake due to the photographer.

It should be understood that, instead of driving a shake correction lens as described above, it would also be acceptable to arrange for shake correction to be performed by shifting the position at which the photographic subject image is formed upon the imaging element 1 in a direction to cancel out the shaking of the imaging device by using a variable apical angle prism, and by changing its apical angle. Or, alternatively, it would also be acceptable to arrange to perform shaking correction by driving the imaging element 1 in directions orthogonal to the optical axis of the photographic lens 2, so as to cancel out the shaking of the imaging device.

The imaging element 1 accumulates electric charge in each of its pixels on the basis of the photographic subject image that is imaged by the photographic lens 2, and outputs an electric signal corresponding to these amounts of accumulated electric charge to the signal processing circuit 9 as an image signal. Due to this, image capture of a photographic subject image is performed by the imaging element 1, and this photographic subject image is converted into an electrical signal and is outputted. It should be understood that the imaging element 1 consists of an imaging element such as, for example, a CCD (Charge Coupled Device) or a CMOS (Complementary Metal Oxide Semiconductor) or the like.

The imaging element drive circuit 8 generates a drive signal at a predetermined timing according to a command outputted from the control circuit 5, and supplies this drive signal that has been generated to the imaging element 1. Due to supply of this drive signal, accumulation of electric charge and reading out of the amounts of accumulated electric charge are controlled by the imaging element 1.

The control circuit 5 obtains information about the brightness of the photographic field on the basis of photometric data for the photographic subject detected by the photometric circuit 15, and, on the basis of this brightness information, determines a time period for electric charge accumulation by the imaging element 1, an iris aperture for the photographic lens 2, an amount of amplification for the image signal outputted by the imaging element 1, and so on. It should be understood that it would also be acceptable for information about the brightness of the photographic field to be obtained from the signal outputted from the imaging element 1. In this case, the imaging element 1 would function as the photometric circuit 15.

The image signal outputted from the imaging element 1 is inputted to the signal processing circuit 9. And, upon command from the control circuit 5, the signal processing circuit 9 performs various types of signal processing upon the image signal that is thus inputted, such as amplification, DC reproduction, A/D conversion, white balancing, gamma conversion and so on. And the data that is obtained after this signal processing is outputted to the data processing circuit 10 as photographic image data.

Upon command from the control circuit 5, the data processing circuit 10 outputs the photographic image data outputted from the signal processing circuit 9 to the compression/decompression circuit 11, and also performs resolution conversion processing required for displaying a reproduced image upon the monitor 13, in other words conversion of the number of pixels of the photographic image data. And the photographic image data after resolution conversion processing is outputted to the display control circuit 14. It should be understood that the data processing circuit 10 may also perform electronic zoom processing. During this electronic zoom processing, resolution conversion processing is performed upon the photographic image data that has been inputted according to a zoom magnification, and the photographic image data after processing is outputted both to the compression/decompression circuit 11 and also to the display control circuit 14.

Upon command from the control circuit 5, after having performed predetermined signal processing upon the photographic image data outputted from the data processing circuit 10, the display control circuit 14 outputs the result to the monitor 13. The display control circuit 14 further performs processing upon the photographic image data to be outputted to the monitor 13 for superimposing data for a predetermined overlay image thereupon such as, for example, a photographic menu or a cursor or the like. Due to this, the image of the photographic subject is displayed upon the monitor 13 with the overlay image superimposed.

Upon command from the control circuit 5, the compression/decompression circuit 11 performs compression processing according to a predetermined image compression method upon the photographic image data outputted from the data processing circuit 10, and outputs the photographic image data after compression to the recording medium 12. It should be understood that, by actuating the operating members 7, the photographer is able to command the imaging device to perform recording of the image data without compression. In this case, the compression/decompression circuit 11 does not perform compression processing, but records the photographic image data outputted from the data processing circuit 10 just as it is upon the recording medium 12.

The operating members 7 include a release button. When the photographer performs photographic actuation with this release button, in response to this photographic actuation, a photographic command is outputted from the control circuit 5 to the imaging element drive circuit 8, to the signal processing circuit 9, to the data processing circuit 10, and to the compression/decompression circuit 11. When this photographic command is outputted from the control circuit 5, processing and control as described above are executed by each of the imaging element drive circuit 8, the signal processing circuit 9, the data processing circuit 10, and the compression/decompression circuit 11. Due to this, photographic image data for the photographic subject image is acquired on the basis of the image signal outputted by the imaging element 1, and is recorded upon the recording medium 12. In this manner, the photographic subject is photographed by the imaging device, a photographic image is acquired, and this photographic image is recorded upon the recording medium 12. It should be understood that when the photographic subject is photographed, as described above, the photographic image data is outputted from the display control circuit 14 to the monitor 13 after resolution conversion processing, and thereby a reproduced image of the photographic image is displayed upon the monitor 13.

On the basis of photographic image data that has already been recorded upon the recording medium 12, it is possible to display a reproduced image on the display monitor 13, according to a photographic image that has already been photographed. This mode, in which a reproduced image according to a photographic image that has already been photographed is displayed in this manner, is termed the reproduction mode.

When the reproduction mode is selected on the imaging device, upon command from the control circuit 5, the compression/decompression circuit 11 reads out photographic image data recorded upon the recording medium 12, and, after having performed decoding processing upon this photographic image data that has been read out for eliminating its compression, outputs the resulting photographic image data after decoding to the data processing circuit 10. And the data processing circuit 10 performs resolution conversion processing upon the photographic image data after decoding that has been outputted from the compression/decompression circuit 11, and outputs the result to the display control circuit 14. By this photographic image data after resolution conversion processing being outputted from the display control circuit 14 to the monitor 13, a reproduced image corresponding to a photographic image that was previously photographed is displayed upon the monitor 13.

It should be understood that, if non-compressed photographic image data is recorded upon the recording medium 12 and this non-compressed photographic image data has been read out from the recording medium 12, then no decoding processing is performed by the compression/decompression circuit 11. It would also be acceptable to arrange for the compression/decompression circuit 11 to perform compression processing and decoding processing by reversible compression, in other words by lossless encoding.

In addition to the release button described above, the operating members 7 also include a zoom operating member. When a zoom actuation signal is outputted from the operating members 7 by this zoom operating member being actuated by the photographer, according thereto, the control circuit 5 generates a lens drive command as previously described, and outputs it to the lens drive circuit 3. And, on the basis of this lens drive command outputted from the control circuit 5, the lens drive circuit 3 drives the zoom lens of the photographic lens 2 forwards and backwards, as previously described. Due to this, the focal length of the photographic lens 2 changes, so that the image of the photographic subject that is imaged upon the photographic imaging surface of the imaging element 1 is magnified or reduced, and thereby zoom adjustment is performed optically.

Moreover, when a zoom actuation signal is outputted from the operating members 7, the control circuit 5 outputs to the data processing circuit 10 a command for the previously described electronic zoom processing to be performed, along with a zoom magnification. And the data processing circuit 10 performs resolution conversion processing as previously described according to this zoom magnification that has been outputted from the control circuit 5, and outputs the photographic image data after processing to the display control circuit 14. The resolution conversion ratio at this time is determined so as to correspond to the electronic zoom magnification. Due to this, the image of the photographic subject that is displayed upon the monitor 13 is magnified or reduced, and thereby electronic zooming is performed.

When, during the electronic zooming described above, the zoom magnification is changed towards the high magnification side, then the center portion of the photographic subject image displayed on the monitor 13 is gradually magnified. At this time, the more the zoom magnification is raised, the narrower does the range of the photographic subject image that is displayed become. Conversely, when the zoom magnification is changed towards the low magnification side, then the photographic subject image displayed on the monitor 13 is gradually reduced in size. At this time, the more the zoom magnification is dropped, the wider does the range of the photographic subject image that is displayed become. And, when photographic actuation is performed with the release button, photographic image data corresponding to the range of the photographic subject image being displayed upon the monitor 13 at this time is recorded upon the recording medium 12.

The shake detection sensor 16 is provided within the body of the imaging device, and consists of, for example, an angular velocity sensor or a gyro sensor or the like. This shake detection sensor 16 detects movement of the imaging device, in other words shaking of the body of the imaging device, at least in two directions orthogonal to the optical axis, and outputs a detection signal to the control circuit 5 according to the amount of shaking that has been detected. And, on the basis of this detection signal, the control circuit 5 performs shake correction as previously described, so as to cancel out shifting of the photographic subject image at the photographic imaging surface of the imaging element 1 caused along with this shaking of the imaging device body. It should be understood that this shake correction may be performed not only during photography; it may also be performed during the acquisition of a through image that will be described hereinafter.

In the following, the operation of the imaging device explained above will be explained. When acquiring a captured image as a still image, in order to reproduce this captured image dynamically, this imaging device is also able to acquire images for special reproduction along with the captured image.

Figure 2:
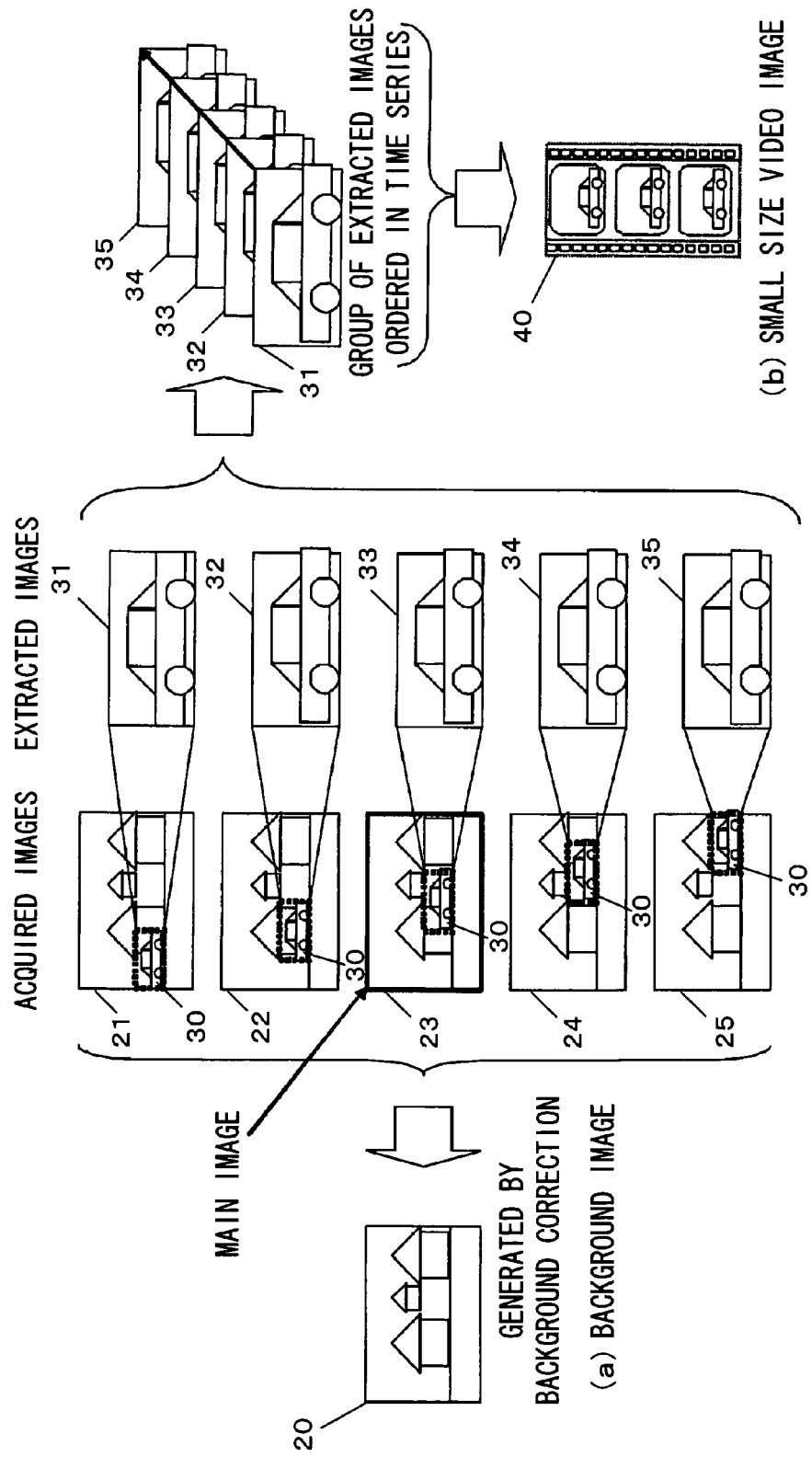
FIG. 2 is a figure showing a situation when images for special reproduction are acquired.

The situation when acquiring images for special reproduction is shown in FIG. 2. On the basis of the image signal outputted from the imaging element 1, the imaging device acquires captured images in time series, for example like those denoted by the reference symbols 21 through 25. When for example, in these captured images 21 through 25, the photographer sets an automobile 30 as being a target photographic subject for dynamic reproduction, then, as shown by the reference symbols 31 through 35, an image of a portion that includes this automobile 30 is extracted from each of these captured images 21 through 25. The images 31 through 35 that have been extracted in this manner will hereinafter be termed the "extracted images".

It should be understood that, among the captured images 21 through 25, the captured image 23 is the captured image that is considered as being the still image acquired due to the photographic actuation by the photographer, and this is termed the "main image". By contrast, the captured images 21 and 22 are captured images that were acquired before photography of the main image 23, and these are termed "pre-images". Moreover, the captured images 24 and 25 are captured images that were acquired after photography of the main image 23, and these are termed "post-images". While here an example is explained in which two pre-images 21 and 22 are acquired before photography of the main image 23 and two post-images 24 and 25 are acquired thereafter, the number of pre-images and the number of post-images are not to be considered as being limited thereby.

After the imaging device has extracted the extracted images 31 through 35 from the captured images 21 through 25, it generates a background image 20 that is a single still image by combining the captured images 21 through 25 from which the extracted images 31 through 35 have been eliminated. For example, it may generate the background image 20 by interpolating the portion in the main image 23 from which the extracted image 33 has been extracted, on the basis of image information in the corresponding portions of the pre-images 21 and 22 and the post-images 24 and 25. It should be understood that the size and the shape of the background image 20 that is generated here may not necessarily be the same as that of the original captured images 21 through 25. For example, if the captured images 21 through 25 were acquired by performing panning while changing the direction of capture by the imaging device horizontally, then it is possible to generate a panorama type background image 20 that is elongated in the horizontal direction by combining these captured images 21 through 25. Furthermore, this imaging device generates a video image 40 by combining the extracted images 31 through 35 in order in time series. After the background image 20 and the video image 40 have been generated in this manner, they are stored upon the recording medium 12 along with the main image 23, as images for special reproduction.

It should be understood that the size of the video image 40 is smaller than that of the captured images 21 through 25. Moreover, irrespective of the number of the captured images 21 through 25, the background image 20 is generated as a single still image. Accordingly the total amount of data in the background image 20 and in the video image 40 becomes smaller than the amount of data when generating a normal video image from the captured images 21 through 25. In other words, it is possible to compress the amount of data by generating the background image 20 and the video images 40 as images for special reproduction.

The situation when a main image 23 that is an image captured as a still image is dynamically reproduced on the basis of images for special reproduction that have been acquired by a method such as explained above is shown in FIG. 3. Instead of reproducing and displaying the main image 23, the imaging device combines the background image 20 and the video image 40, and reproduces and displays the result upon the monitor 13. At this time, reproduced images such as those denoted by the reference symbols 41 through 45 are displayed successively by displaying the video image 40 as overlaid over the background image 20 and by shifting its display position over the background image 20. In these reproduced images 41 through 45 the movement of the automobile 30, i.e. of the target photographic subject, is recreated so as to be similar to the captured images 21 through 25 in FIG. 2. It should be understood that, if the size or the shape of the background image 20 is different from that of the main image 23, then, according to this size or shape, the background image 20 may be scrolled or the background image 20 may be magnified or shrunk down, with the video image 40 then being displayed as overlaid thereover. For example, if as previously described the background image 20 is a panorama type image that is elongated in the horizontal direction, then, along with providing a display of the background image 20 that scrolls in the horizontal direction, the video image 40 may be overlapped over the background image 20 while shifting the video image 40 in correlation with this scrolling operation. It should be understood that, if the background image 20 is displayed as magnified or reduced, then it is desirable also to magnify or reduce the video image 40 in synchronization therewith.

Figure 4:
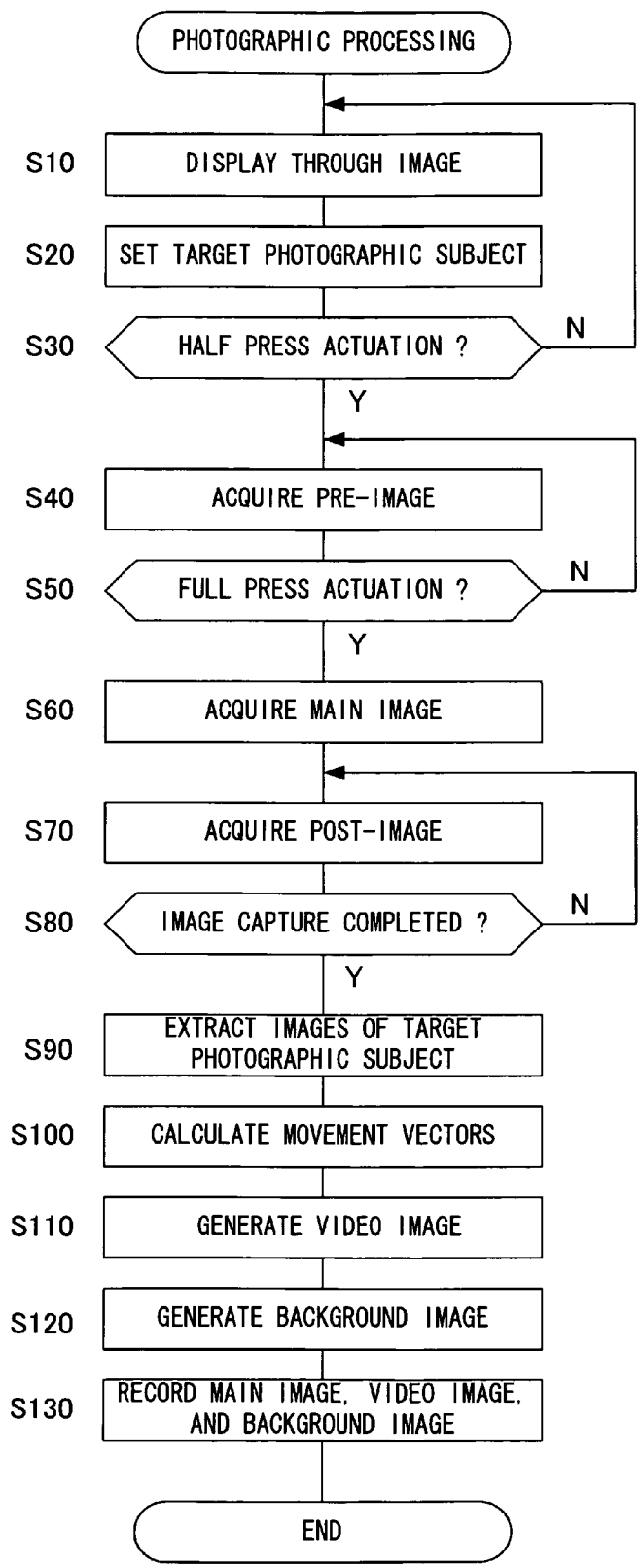
FIG. 4 is a flow chart for photographic processing that is executed when these images for special reproduction are acquired.

A flow chart of photographic processing that is executed when acquiring the above described images for special reproduction is shown in FIG. 4. This photographic processing is executed by the control circuit 5 when the imaging device has been set to a predetermined mode for special type photography. In a step S10, the control circuit 5 displays a through image on the monitor 13 on the basis of the image signal outputted from the imaging element 1.

In the step S10 described above, the control circuit 5 sends a command to the imaging element drive circuit 8, thus causing the imaging element drive circuit 8 to output a drive signal for executing through image photographic operation. And, upon receipt of this drive signal, at a predetermined frame rate, for example at thirty frames per second, the imaging element 1 successively outputs image signals corresponding to the amount of electric charge accumulated by each of its pixels. And the signal processing circuit 9, along with performing signal processing as previously described upon the image signal outputted from the imaging element 1, also adds together the signals from pixels of the same color that are positioned mutually neighboring one another upon the imaging element 1. Due to this, photographic image data having a lower resolution as compared to when the pre-images, the main image, and the post-images are acquired, in other words having a lesser number of pixels, is outputted to the data processing circuit 10 as photographic image data for this through image. And through images of the photographic subject are acquired in this manner. It should be understood that, at this time, the exposure conditions are determined on the basis of the photometric data from the photometric circuit 15. At this time, instead of adding together signals from pixels of the same color, it would also be acceptable to arrange to read out the image signals from the imaging element 1 while thinning them down.

The data processing circuit 10 performs resolution conversion processing upon the photographic image data for the through image outputted from the signal processing circuit 9, and then, along with temporarily storing the data after processing, it also outputs that data to the display control circuit 14. It should be understood that a memory is included in the data processing circuit 10 for temporarily storing this photographic image data for the through image after resolution change processing. In a step S10 described above, the control circuit 5 causes the display control circuit 14 to display a through image on the monitor 13 on the basis of the data outputted from the data processing circuit 10. Due to this, a through image of the photographic subject is displayed upon the monitor 13. By a through image being displayed in this manner, it is made possible for the photographer to observe the state of the photographic field that he is attempting to photograph from now on upon the screen of the monitor 13.

It should be understood that, during the above described acquisition of through images, the photographic subject is photographed at a lower pixel resolution than during acquisition of the pre-images, the main image, and the post-images. In other words, the through images are acquired at a lower pixel resolution than the resolution during main photography, by reading out the amounts of electric change for each pixel of the imaging element 1 while thinning them down, or by reading out the amounts of electric charge for a plurality of pixels and adding them together. Due to this, it becomes possible to perform photography at a high frame rate. Moreover, the data for the through images that are acquired is not recorded upon the recording medium 12.

It would also be acceptable to arrange to perform adjustment of the focus of the photographic lens 2 by executing auto focusing operation during the acquisition of the through image as explained above, according to requirements. It should be understood that, during this focus adjustment, it is possible to detect the required focal adjustment state by, for example, phase difference detection according to a well known split pupil method, using pixels for focus detection provided to the imaging element 1, and a focus detection optical system such as a micro lens or the like provided for each of these pixels. Or an element that includes these pixels for focus detection may be provided separately from the imaging device 1, and it may be arranged to perform focus adjustment using this element. Or it would also be acceptable to arrange to utilize some other method, such as a contrast method or the like.

In a step S20, using the through image displayed upon the monitor 13 in the step S10, the control circuit 5 sets a photographic subject to be taken as the subject for dynamic reproduction. For example, a photographic subject that corresponds to a position designated upon the through image by the photographer by actuation of the operating members 7 may be extracted, and this may be set as the target photographic subject. Or, it would also be acceptable to arrange for the imaging device to set the target photographic subject automatically. For example, the imaging device may distinguish a portion that is moving within the through image, or may distinguish a portion within the through image for which the degree of matching with a template image that has been registered in advance on the basis of the face of a person or the like is greater than or equal to a predetermined value, and this may be set to be the target photographic subject. It is desirable for the target photographic subject that has been set in this manner to be displayed in a way that makes it possible for the photographer to distinguish it, as for example by being displayed in a frame upon the through image or the like. It should be understood that it would be acceptable to make the setting of the target photographic subject and the focus adjustment of the photographic lens 2 be performed in cooperation.

In a step S30, the control circuit 5 makes a decision as to whether or not the release button of the operating members 7 has been half press actuated by the photographer. If half press actuation has been performed and a half press actuation signal is inputted to the control circuit 5 from the operating members 7 on the basis of this half press actuation, then the control circuit 5 transfers the flow of control to the next step S40. On the other hand, if half press actuation has not been performed, then the control circuit 5 returns the flow of control to the step S10, and the through image display is continued.

In the step S40, the control circuit 5 acquires a pre-image on the basis of the image signal that is outputted from the imaging element 1 due to the imaging element 1 capturing an image of the photographic subject. At this time, for this pre-image, an image is acquired that has been captured at a higher resolution than the through image that was displayed in the step S10 described above.

In a step S50, the control circuit 5 makes a decision as to whether or not the release button of the operating members 7 has been full press actuated by the photographer. If full press actuation has been performed and a full press actuation signal is inputted to the control circuit 5 from the operating members 7 on the basis of this full press actuation, then the control circuit 5 transfers the flow of control to the next step S60. On the other hand, if a full press actuation signal has not been inputted, then the control circuit 5 returns the flow of control to the step S40, and the acquisition of pre-images is continued. Due to this, during the interval from when the release button is half press actuated to when it is full press actuated, a plurality of pre-images are repeatedly acquired on a predetermined cycle.

In the step S60, due to the imaging element 1 capturing an image of the photographic subject, the control circuit 5 acquires a main image based upon the image signal outputted from the imaging element 1. Similarly to the case with the pre-images acquired in the step S40, this main image is an image captured at a higher resolution than the through image that was displayed in the step S10.

In a step S70, the control circuit 5 acquires a post-image on the basis of the image signal outputted from the imaging element 1 due to the imaging element 1 capturing an image of the photographic subject. Similarly to the case with the pre-images acquired in the step S40 and the main image acquired in the step S60, for this post-image, an image is acquired that has been captured at a higher resolution than the through image.

By acquiring the pre-images, the main image, and the post-images due to the processing of the steps S40, S60, and S70 as explained above, this plurality of captured images are acquired in time series by the imaging device. It should be understood that it is desirable for the resolutions of all of these captured images to be the same, in order for a background image and a video image to be generated on the basis of these pre-images, this main image, and these post-images described above.

In a step S80, the control circuit 5 makes a decision as to whether or not photography has been completed. For example, if the photographer has stopped actuating the release button, or if a predetermined time period has elapsed from the full press actuation that was determined upon in the step S50, then the control circuit 5 may decide that photography has been completed, and then the flow of control proceeds to a step S90. On the other hand, if this type of condition is not satisfied, then the control circuit 5 decides that photography has not yet been completed, and the flow of control returns to the step S70, so that acquisition of post-images is continued. Due to this, during the interval from when the release button is full press actuated until photography is completed, a plurality of post-images are repeatedly acquired on a predetermined cycle.

In the step S90, the control circuit 5 extracts the image of the target photographic subject that was set in the step S20 from each of the pre-images that were acquired in the step S40, from the main image that was acquired in the step S60, and from each of the post-images that were acquired in the step S70. By doing this, a plurality of extracted images corresponding to the target photographic subject are acquired.

In a step S100, the control circuit 5 calculates movement vectors that specify the manner in which the position of the target photographic subject changes. Here, the manner in which the position of extraction of each of the images extracted in the step S90 changes from each frame to the next, in concrete terms, the direction of changing and the amount of changing of the position of extraction between each adjacent pair of images in time series order, are calculated as being these movement vectors. In other words, the start point of each movement vector is specified as being the position of extraction of the image that was extracted from the first-acquired one of two images, and the end point of the movement vector is specified as being the position of extraction of the image that was acquired from the later-acquired one of those two images. Moreover, the length of the movement vector is specified as being the amount of change of the position of extraction between the two images. Information specifying the position and the movement of the target photographic subject against the background image is acquired by calculating a movement vector in this way for each of the images.

Figure 3:
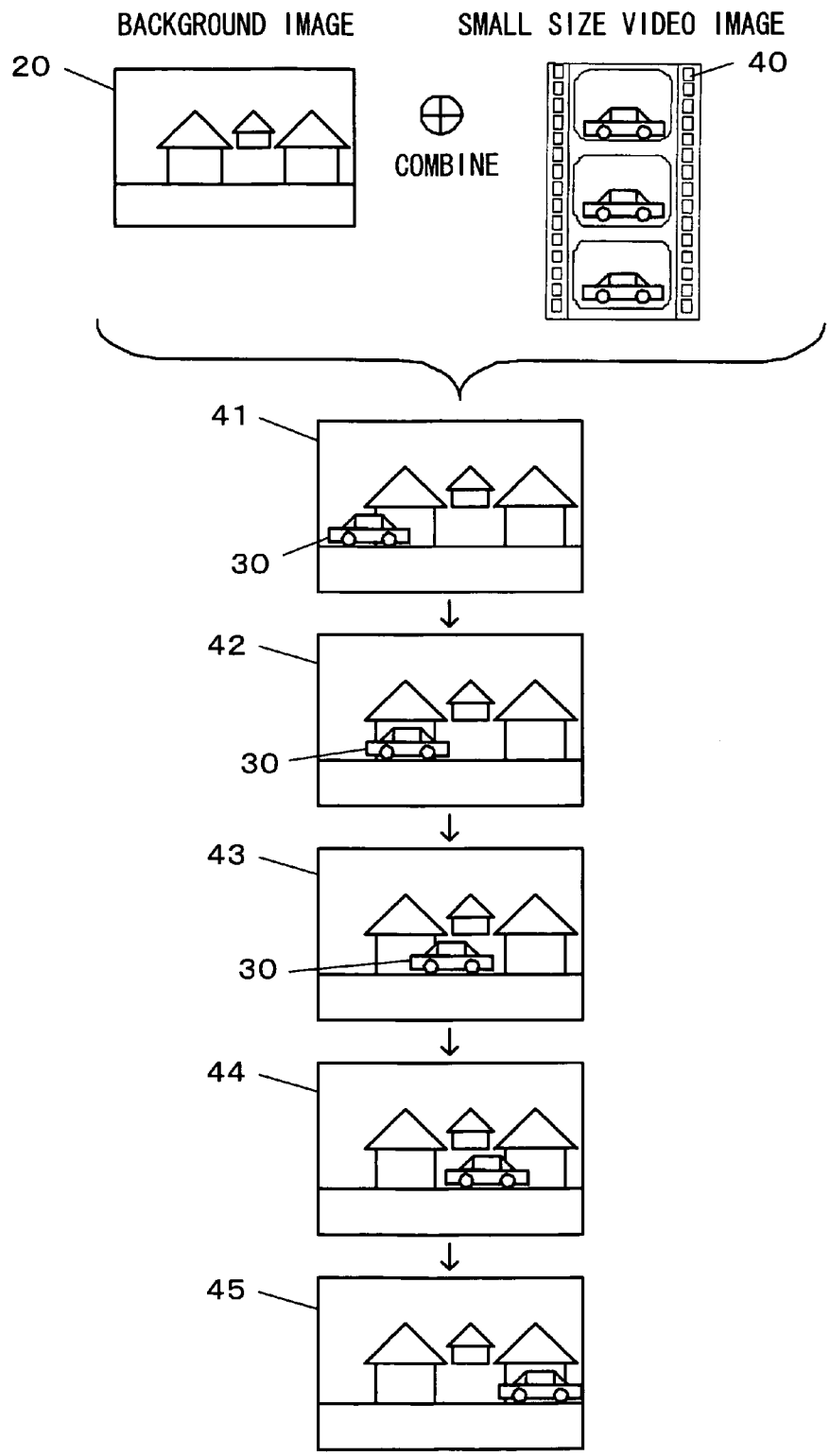
FIG. 3 is a figure showing a situation when an image that has been captured as a still image is dynamically reproduced.

In a step S110, the control circuit 5 generates a video image of the target photographic subject on the basis of the images of the target photographic subject that were extracted in the step S90. Due to this, the video image 40 of FIG. 3 is generated. It should be understood that information specifying the movement vectors that were calculated in the step S100 is appended to the video image calculated in this step S110. Or, instead of appending the movement vectors, it would also be acceptable to arrange to append, to the video image, position information for the target subject in each frame with respect to the background image. It would be possible to append, to the video image, information specifying the position and the movement of the target photographic subject with respect to the background image in this manner as well.

In a step S120, on the basis of the images from each of which the target photographic subject was extracted in the step S90, the control circuit 5 generates a background image. At this time, as previously described, the image information for the portions from which the extracted images were extracted is interpolated using the plurality of images. By doing this, the background image 20 of FIG. 3 is generated.

In a step S130, the control circuit 5 records the main image that was acquired in the step S60, the video image that was generated in the step S110, and the background image that was generated in the step S120 upon the recording medium 12 in mutual correspondence. By doing this, along with the main image being photographed, the video image and the background image, that are the images for special reproduction needed in order to reproduce the target photographic subject dynamically, are acquired and are recorded upon the recording medium 12. When this step S130 has been executed, the control circuit 5 terminates the photographic processing of FIG. 4.

Figure 5:
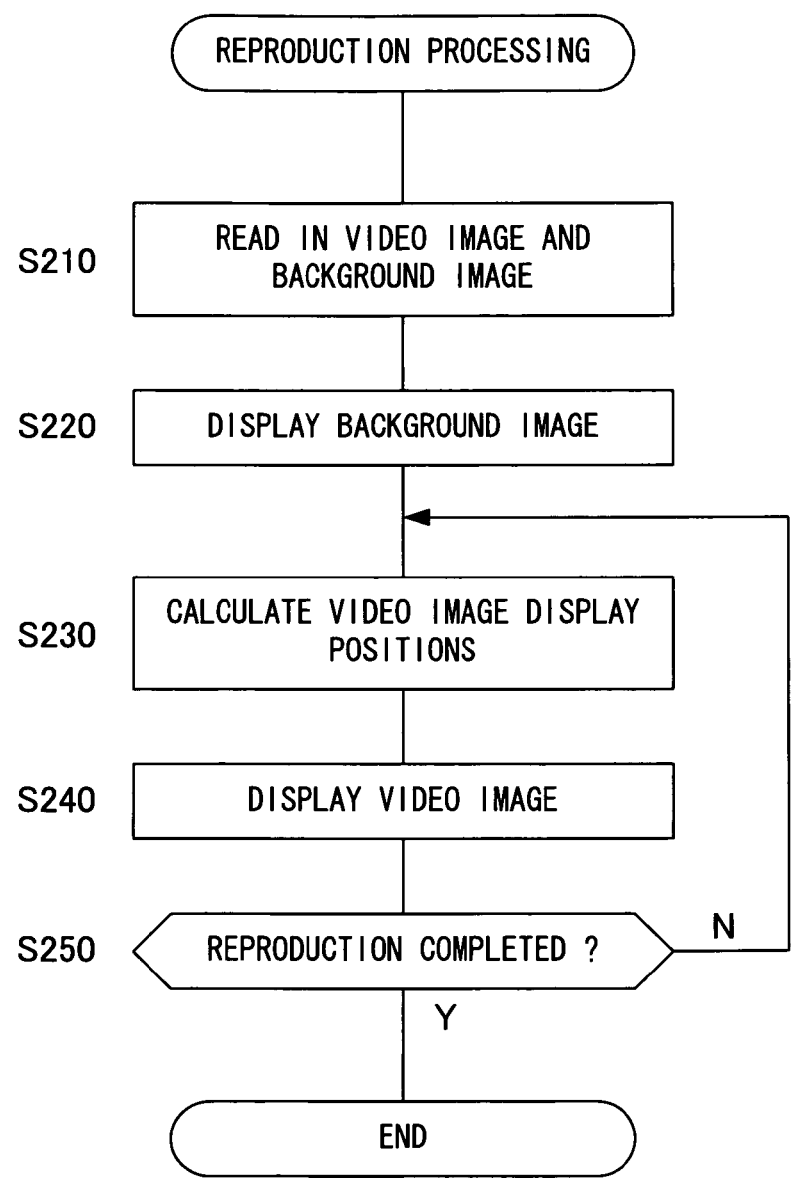
FIG. 5 is a flow chart for reproduction processing that is executed when the captured image is dynamically reproduced based upon these images for special reproduction.

Next, processing for dynamically reproducing a captured image on the basis of its images for special reproduction will be explained with reference to the flow chart for reproduction processing shown in FIG. 5. This reproduction processing is executed by the control circuit 5 when a main image that has been acquired as a still image by the photographic processing of FIG. 4 has been selected in the special reproduction mode. In a step S210, the control circuit 5 reads in from the recording medium 12 the video image and the background image as being special reproduction images for performing reproduction, and temporarily stores them in a memory within the control circuit 5.

In a step S220, the control circuit 5 displays the background image that has been read in by the step S210 upon the monitor 13. At this time, as previously described, it would also be acceptable to scroll the background image or to magnify or to reduce the background image.

In a step S230, on the basis of the information for the movement vectors appended to the video image read in by the step S210, the control circuit 5 calculates display positions for when the video image is displayed superimposed upon the background image. Here, display positions for the video image are obtained in order from the first frame of the video image, on the basis of the start point positions of the movement vectors.

In a step S240, the control circuit 5 displays the video image that was read in by the step S210 upon the monitor 13. Here, the video image is displayed in the display position calculated by the step S230, superimposed upon the background image displayed by the step S220.

In a step S250, the control circuit 5 makes a decision as to whether or not reproduction has been completed. If the system has already finished displaying all the frames of the video image, or if a predetermined stop actuation has been inputted by actuation of the operating members 7, then it is decided that reproduction has been completed, and the flow chart of FIG. 5 terminates. On the other hand, if this type of reproduction completed condition is not satisfied, then it is decided that reproduction is still continuing, and the flow of control returns to the step S230, so that the steps S230 and S240 are executed repeatedly. In this manner, during reproduction, the video image is displayed over the background image, and next the display position of the video image is shifted over the background image so as to match the movement of the target photographic subject. Due to this, the captured image is dynamically reproduced.

It should be understood that it is desirable, after the reproduction processing has terminated, to return to the same screen state as before reproduction. For example, when the main image that has been displayed up until now upon the monitor 13 has been dynamically reproduced, then the display screen is returned, not to the screen after dynamic reproduction, but rather to displaying the original main image. Or it would also be acceptable to repeat the dynamic reproduction. Moreover, it would also be acceptable to arrange to perform this type of dynamic reproduction of a capture image in a thumbnail image.

According to the embodiment explained above, the following advantageous operational effects are obtained.

(1) On the basis of a captured image that has been obtained by capturing an image of a photographic subject by photographic processing executed by the control circuit 5, the imaging device generates a video image of a target photographic subject that has been set within this photographic subject (in the step S110), and also generates a background image for the target photographic subject (in the step S120). By performing reproduction of the captured image using the video image and the background image that have been generated in this manner, it is possible to reproduce dynamically a captured image that has been acquired as a still image.

(2) The control circuit 5 acquires a plurality of captured images in time series (in the steps S40, S60, and S70), and these constitute the pre-images, the main image, and the post-images. Since it is arranged to generate the video image and the background image by executing the processing of the steps S110 and S120 on the basis of the plurality of captured images that have been acquired in this manner, accordingly it is possible to generate the video image and the background image that are to be applied in dynamic reproduction.

(3) In the step S110, the control circuit 5 generates the video image on the basis of the images of the target photographic subject that have been extracted from the plurality of captured images. Moreover, in the step S120, it generates a single still image on the basis of the plurality of captured images, and this serves as the background image. Accordingly it is possible to compress the amount of data, as compared to the case of generation of a normal video image.

(4) To the video image that is generated in the step S110, the control circuit 5 appends information for the movement vectors to specify the positions of the target photographic subject with respect to the background image, and to specify the movement of the target photographic subject with respect to the background image. Since this is done, accordingly it is possible to express the movement of the target photographic subject during dynamic reproduction in an appropriate manner.

(5) Due to the reproduction processing executed by the control circuit 5, the imaging device dynamically reproduces the captured image on the basis of the video image and the background image that were generated during the photographic processing described above. In concrete terms, the imaging device reads in the video image and the background image (in the step S210), and displays the video image superimposed over the background image while shifting the display position for this video image over the background image (in the step S240), thereby dynamically reproducing the captured image. Since this is done, accordingly it is possible to implement dynamic reproduction of the captured image in which appropriate expression is given to the movement of the target photographic subject.

It should be understood that, in the embodiment explained above, it would also be acceptable to arrange to perform only one or the other of the pre-image acquisition processing performed in the step S40, and the post-image acquisition processing performed in the step S70. In other words provided that, during photography, it is possible to acquire a plurality of captured images including at least a main image, then it is acceptable to arrange to omit acquisition either of the pre-images or of the post-images.

Furthermore, it would also be acceptable to arrange for the generation of the video image and of the background image as explained above, and the dynamic reproduction of the captured image, to be performed by an image generation device or an image reproduction device that is different from the imaging device. In other words, it would be acceptable to arrange for the captured images acquired by the imaging device to be fed into an image generation device, and for the image generation device to generate the video image and the background image on the basis of these captured images. Or, it would also be acceptable for the video image and the background image generated by the imaging device or by an image generation device to be read in by an image reproduction device, and for dynamic reproduction of the captured image to be performed on the basis thereof.

Figure 6:
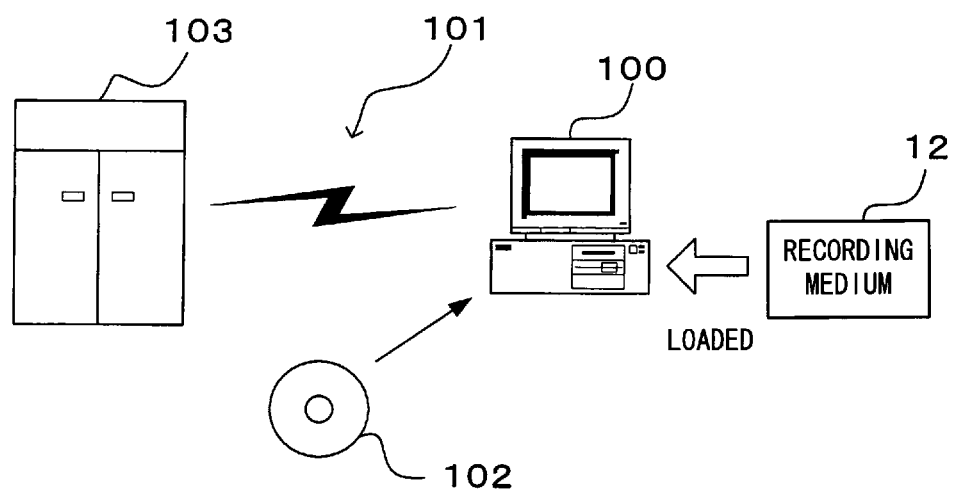
FIG. 6 is a figure showing an example of a personal computer that is being used as an image reproduction device.

In this case, a program related to control as described above may be supplied upon a recording medium such as a CD-ROM or the like, or via an electrical communication circuit such as the interne or the like. FIG. 6 shows an example in which a personal computer is used as an image reproduction device. A personal computer 100 receives supply of the program via a CD-ROM 102. Or, it would also be acceptable for the personal computer 100 to be endowed with a function of connection to a communication circuit 101, and to be supplied with the program described above from a server 103. The communication circuit 101 may be the interne, or a communication circuit for personal computer communication or the like, or a dedicated communication circuit or the like. The server 103 transmits the program to the personal computer 100 via the communication circuit 101. In other words, the program is converted to a data signal on a carrier wave, and is transmitted via the communication circuit 101. In this manner, the program may be supplied as a computer-readable computer program product in various formats, such as upon a recording medium or via a carrier wave or the like.

A recording medium 12 upon which a video image and a background image of the types previously described are recorded is loaded into the personal computer 100 described above. The personal computer 100 executes the reproduction processing shown in the flow chart of FIG. 5 on the basis of the image reproduction program supplied on the CD-ROM 102 or from the server 103. In other words, the processing of the step S210 in which the video image and the background image are read in from the recording medium 12, the processing of the step S220 in which the background image that has been read in is displayed upon a monitor that is connected to the computer 100, the processing of the step S230 in which the display positions for the video image are calculated, the processing of the step S240 in which the video image is displayed upon the monitor, and the processing of the step S250 in which a decision is made as to whether or not reproduction has been completed, are executed. Due to the processing of the steps S220, S230, and S240 among these steps, the captured image is dynamically reproduced upon the monitor on the basis of the video image and the background image that were read in by the step S210. In other words, it is possible to reproduce the captured image dynamically by displaying, in the step S240, the video image upon the monitor as superimposed upon the background image that was displayed in the step S220, and by shifting the positions in which this video image is displayed over the background image according to the display positions calculated in the step S230.

It should be understood that the embodiment explained above is only one example of an embodiment of the present invention. Accordingly, in the interpretation of this invention, no restrictions are imposed upon the correspondence relationship between elements described above and elements described in the Claims. Moreover, the present invention is not to be considered as being limited by the details described above, provided that the essential characteristics of the present invention are not lost.

The contents of the disclosure of the following application, upon which priority is claimed, are hereby incorporated herein by reference:

Japanese Patent Application No. 2008-244361 (filed on Sep. 24, 2008).

EXPLANATION OF SYMBOLS

1: imaging element, 2: photographic lens, 3: lens drive circuit, 5: control circuit, 7: operating members, 8: imaging element drive circuit, 9: signal processing circuit, 10: data processing circuit, 11: compression/decompression circuit, 12: recording medium, 13: monitor, 14: display control circuit, 15: photometric circuit, 16: shake detection sensor.

The invention claimed is:

1. An image generation device comprising:
    a video image generation unit that extracts images of a target photographic subject within a photographic subject respectively from a plurality of captured images that are acquired by capturing images of the photographic subject in time series and generates a video image of the target photographic subject based on the extracted images of the target photographic subject, the target photographic subject moving in the generated video image; and a background image generation unit that generates a single still background image, in which an image of the target photographic subject is eliminated, based on the captured images, wherein:

the generated video image and the generated single still background image are recorded into a recording medium respectively in mutual correspondence to each other, and by combining the generated video image on the generated single still background image recorded in the recording medium, the video image of the target photographic subject is reproduced on the single still background image so as to dynamically reproduce one of the captured images.

2. The image generation device according to claim 1, wherein information is appended to the video image, the information specifying a position of the target photographic subject with respect to the single still background image, and the information specifying movement of the target photographic subject with respect to the single still background image.

3. An imaging device comprising:

the image generation device according to claim 1; and an image capture device that captures images of the photographic subject and thereby acquires the captured images.

4. The image generation device according to claim 1, wherein the background image generation unit generates the single still background image based on images generated by respectively eliminating the images of the target photographic subject from the captured images.

5. The image generation device according to claim 1, wherein the background image generation unit generates the single still background image by combining images generated by respectively eliminating the images of the target photographic subject from the captured images.

6. The image generation device according to claim 1, wherein:

the one of the captured images is a main image, and the main image, the video image and the single still background image are recorded into the recording medium respectively in mutual correspondence with each other so that, by combining the generated video image on the generated single still background image recorded in the recording medium, a video image related to the main image is reproduced.

7. An image reproduction device that, based on the video image and the single still background image generated by the image generation device according to claim 1, dynamically reproduces the one of the captured images.

8. The image reproduction device according to claim 7, wherein the one of the captured images is dynamically reproduced by displaying the video image overlaid over the single still background image, and by shifting a display position for the video image over the single still background image.

9. A non-transitory computer-readable recording medium on which is stored an image reproduction program for, based on the video image and the single still background image generated by the image generation device according to claim 1, dynamically reproducing one of the captured images with a computer that is connected to a monitor, the program including instructions that cause the computer to execute:

a reading step of causing the video image and the single still background image to be read into the computer; and a reproduction step of causing the computer dynamically to reproduce and display the one of the captured images upon the monitor, based on the video image and the single still background image read in by the computer in the reading step.

10. The non-transitory computer-readable recording medium on which is stored the image reproduction program according to claim 9, wherein in the reproduction step, the computer is caused dynamically to reproduce the one of the captured images upon the monitor by displaying the video image upon the monitor overlaid over the single still background image, and by shifting a display position of the video image over the single still background image.

* * * * *